United States Patent
Lau

Patent Number: 5,597,233
Date of Patent: Jan. 28, 1997

[54] LIGHT FIXTURE

[76] Inventor: Kenneth Lau, 4327 Point Reyes Ct., Carlsbad, Calif. 92008

[21] Appl. No.: 221,803

[22] Filed: Apr. 1, 1994

Related U.S. Application Data

[63] Continuation-in-part of Ser. No. 188,807, Jan. 31, 1994, Pat. No. 5,471,375, and a continuation-in-part of Ser. No. 832,988, Feb. 10, 1992, abandoned, and a continuation-in-part of Ser. No. 61,599, May 12, 1993, Pat. No. 5,362,246.

[51] Int. Cl.⁶ ............................................. F21V 29/00
[52] U.S. Cl. .................. 362/294; 362/364; 362/373
[58] Field of Search ............................ 362/147, 216, 362/218, 221, 222, 260, 294, 364, 373; 315/56, 71, 58

[56] References Cited

U.S. PATENT DOCUMENTS

| | | | |
|---|---|---|---|
| 3,883,732 | 5/1975 | Peterson et al. | 362/294 |
| 4,275,433 | 6/1981 | Caldwell | 362/294 |
| 4,497,016 | 1/1985 | Sachse | 362/294 |
| 4,858,089 | 8/1989 | Pietro | 362/373 |

FOREIGN PATENT DOCUMENTS 4109507  4/1992  Japan ........................ 362/373

*Primary Examiner*—Y My Quach
*Attorney, Agent, or Firm*—Ralph S. Branscomb

[57] ABSTRACT

A lighting system is designed to replace incandescent lighting by alternatively adapting existing recessed incandescent fixtures to accept more efficient lamps such as fluorescents, or using specially designed surface mount housings. In either case the invention addresses the problem of overheating of the on-board power stabilizing circuitry which almost universally occurs when an enclosed fixture designed for incandescent lamps is fitted with fluorescent replacements. Rather than installing the power stabilizer in the enclosure with the hot lamp in direct parallel to conventional incandescent mounting, the power stabilizing circuitry is physically removed from the lamp housing and isolated from it by a curtain of circulating cooler air. The preferred embodiments house these electronics in a rim or halo around the light, with the rim so produced also acting as a decorative trim element and providing limited control of the light beam in some instances.

6 Claims, 6 Drawing Sheets

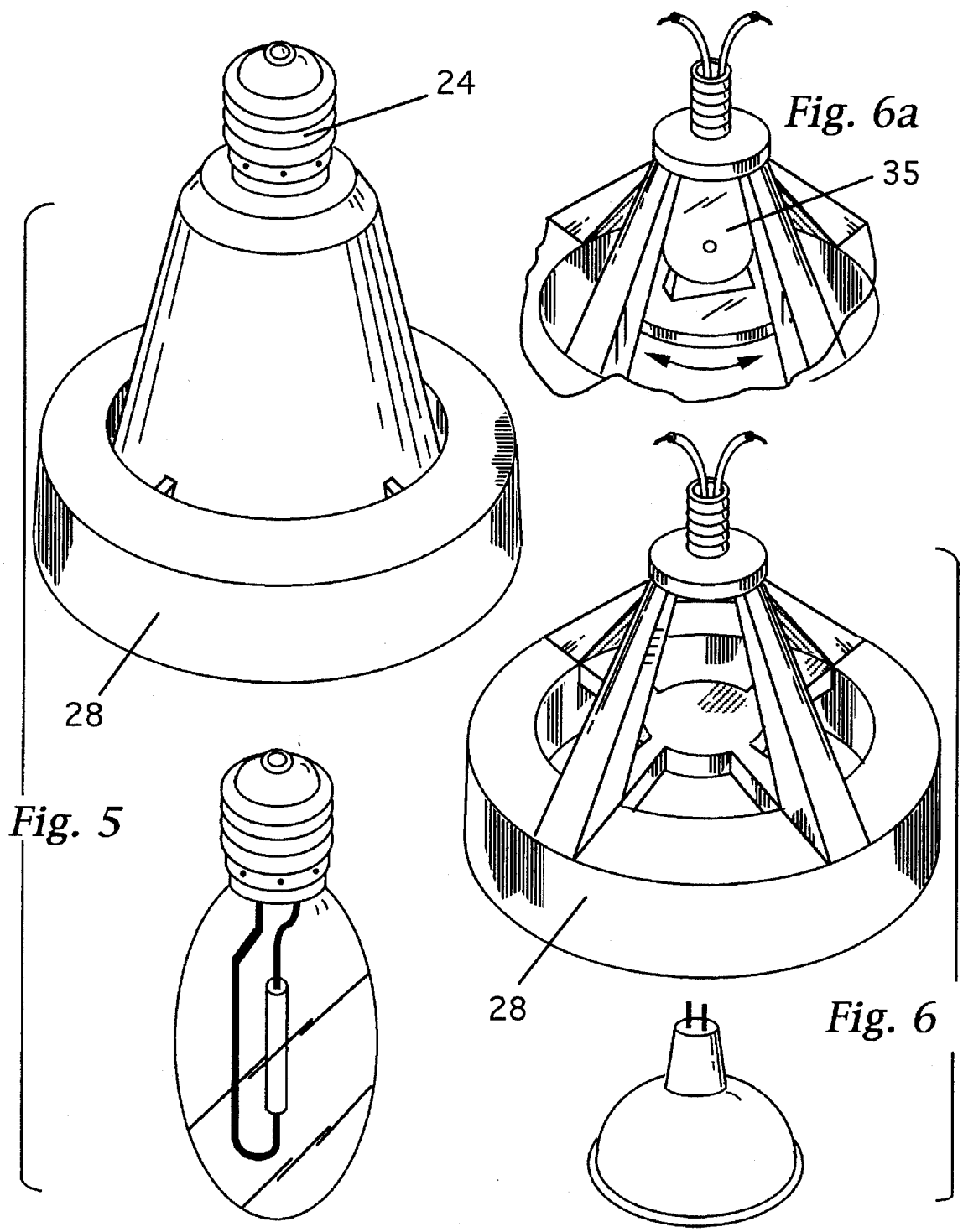

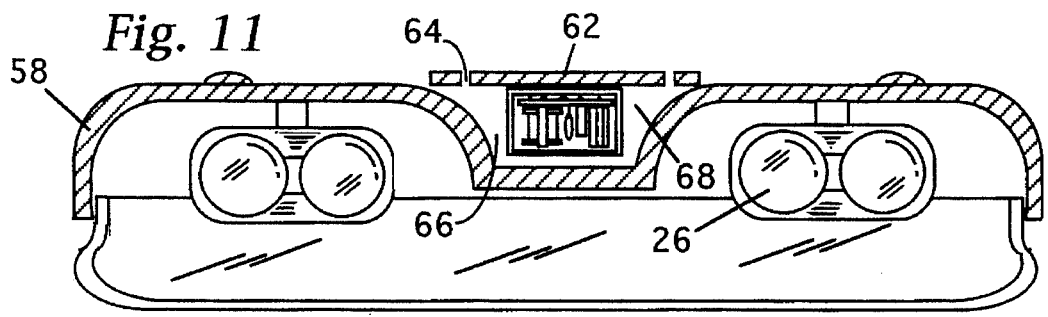
Fig. 11
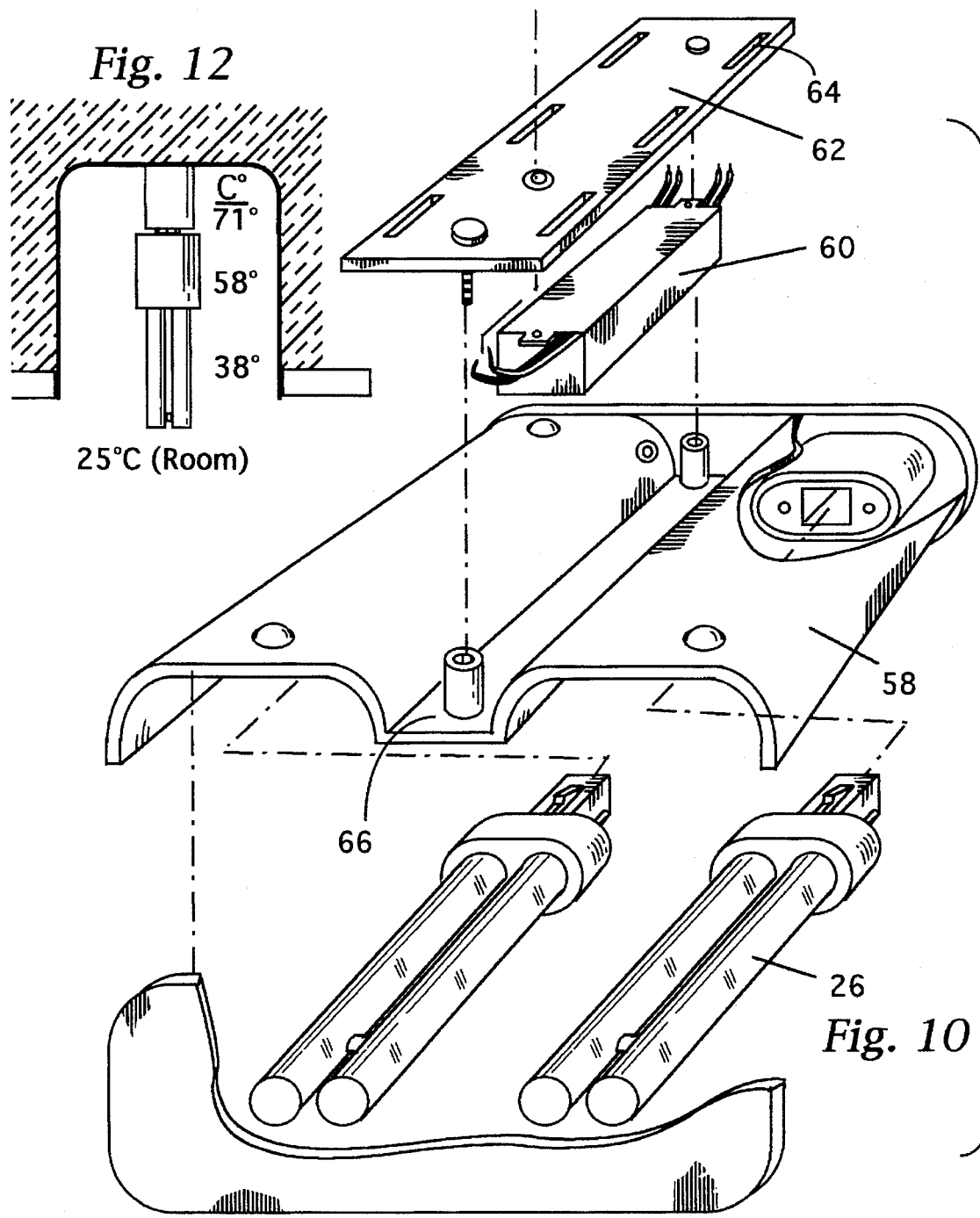
Fig. 12
25°C (Room)
Fig. 10

LIGHT FIXTURE

The invention is in the field of fluorescent lighting and other high-efficiency lighting, and is a Continuation-in-Part of U.S. patent application Ser. No. 08/188,807 filed Jan. 31, 1994 now U.S. Pat. No. 5,471,375, on a FLUORESCENT LIGHT BALLAST LAMP MOUNTING SOCKET CONSTRUCTION (a C.I.P. of Ser. No. 832,988) filed Feb. 10, 1992, now abandoned, and application Ser. No. 061,599 filed May 12, 1993 now U.S. Pat. No. 5,362,246, on a CONVERTIBLE FLUORESCENT ADAPTOR WITH COMPACTED INSTALLATION, both invented by the instant inventor. All three disclosures pertain to adapting fluorescent (and other energy-efficient) lighting to existing fixtures that have been designed and located with the intention of using incandescent lamps.

BACKGROUND OF THE INVENTION

The invention is primarily designed for use with one or more fluorescent lamps because of their widespread popularity, but accommodates any type of lamp which requires an auxiliary power stabilizing circuit. In addition to fluorescents, commonly used alternative lighting of this type includes low voltage halogen lamps, and high intensity discharge (HID) lamps, both of which are more compact and efficient than incandescents. All of these lamps require a circuit device to condition the power, as they will not operate on the U.S. standard, 110 volts at 60 Hz. current. In this specification, the lamps will be described as "fluorescent", and the power stabilizing circuit as the "ballast", but it will be understood that the term "fluorescent" refers generically to any lamp which requires an on-board (or auxiliary) device or circuit to stabilize the current or the voltage, or both, and such circuit or device is covered by the term "ballast". The ballast converts the local power, whether it be AC, DC, 110-Volt, 277-Volt or whatever, to the form for which the lamp and system were designed, so the same lamp is used everywhere, with the electronics being the adaptive factor.

With the advantage of more efficiency, these lamps come with the baggage of the auxiliary circuit requirement, and an inherent circuit overheating problem. Heat damage will result from continued exposure to the hot cathodes of the lamp, especially if the circuit is enclosed in the same housing as the lamp. Although the subject lamps are more efficient than incandescents by a factor of up to eight or ten to one, nonetheless up to 75% of the energy they consume is dissipated as heat. And whereas manufacturers recommend that the ambient temperature be no higher than 40° centigrade, and never greater than 50°, studies have shown that in a recessed ceiling can temperatures around the upper area where the ballast would be, routinely exceed 70° centigrade in a 25°-degree room using a 27-watt fluorescent. Higher wattages mean commensurately higher temperatures. In that temperature range, circuit life is halved for every 10°-rise in temperature due to cumulative heat-induced insulation deterioration.

This disclosure specifically addresses ceiling-mounted fixtures, including "cans" recessed behind the the ceiling panels, and surface mounted fixtures similar in lighting function and external appearance to can mounts but not being recessed. Retrofitting these cans to accept fluorescent lighting, or other lighting which is more efficient than incandescent, presents several problems. For one thing, the compact fluorescent lamps and adapters which are designed to replace light bulbs are generally too long to fit within the can and extend out slightly beyond the housing in ceiling-mount installations with vertical lamps. The can's translucent diffusion covers may have to be removed, resulting in the creation of both glare and aesthetic problems, which present obstacles to upgrading hotel corridors, lobbies and rooms and other large commercial establishments whose multiplicity of can installations cry for conversion to low-energy lighting.

If the ceiling can is a side-mount version designed to use a horizontally extended incandescent bulb, the typical compact fluorescent adaptor and lamp designed for retrofitting will not fit at all, since the tube does not have the option of extending beyond the boundary of the can. There are cans designed specifically for housing fluorescent replacements, but making these installations as retrofit conversions is very labor intensive and expensive. Worse, when finished the ballasts are still at the hot end of the can, still subject to premature failure from continuous exposure to heat not only from the lamp but from hot pipes and other equipment that is found between the ceiling joists. Upgrading often cannot be economically justified by lower utility bills, even without considering the reduced lamp and ballast life expectancy.

Much of the heat problem is caused by the practice of using standard compact fluorescent adapters which have the ballast around the base. Heat is also generated by the ballast itself, although this heat is dwarfed by the heat output of the lamp. These base-mounted units work fine for floor and ceiling lamps where there is adequate ventilation and the lamp base housing the electronics is below, not above, the hot lamp. But an inverted can, even though provided with ventilation holes, accumulates heat to destructive levels. This problem is aggravated by the fact that electronic ballasts, which replace the older coiled wire transformer-type ballasts, are much more sensitive to heat than traditional ballasts. The newer design has advantages in efficiency, reduced volume and weight, and inherent packaging versatility stemming from the ability to separate the components into different areas of the mounting fixture for compactness. These advantages lead to the use of electronic ballasts in applications for which they are not suited.

It is probably relatively rare for a construction salesperson to advise the building owner, responsible for authorizing an upgrade, of these problems, which skewer the economic balance even more against replacement.

Due to these problems, although hotels and other commercial establishments are slowly converting to reduced power consumption lighting, still only a small fraction of the possible conversions are actually being made. With a clear cost disadvantage of upgrading in some installations, it is difficult for the establishment to justify to the shareholders the changeover as part of its duty as a world citizen. There is a need for a simple retrofit unit which will enable can-mounted lighting to take full advantage of the economics of fluorescent tubes by preventing premature burn-out of electronic ballasts.

SUMMARY OF THE INVENTION

The instant invention fulfills the above-stated need by providing a fixture which comes in several variations, but in all instances has a ballast compartment housed separately from the lamp housing, and defining an air curtain between the lamp housing and the ballast. In addition to separation of the ballast from the lamp housing, several other design features keep the ballast cool. First, the passageway between the ballast and the lamp is preferably home to a moving air curtain which continuously draws up cool air alongside the ballast, driven by lamp-induced heat convection. Secondly, because the ballast is beneath the lamp if practicable, it is substantially upwind from the hot airflow generated by the electrodes or filament, rather than immersed in it immediately above the hottest part of the lamp, as is traditional. Cooling air passes up around the ballast first, before it reaches the lamp, and then into the can, accumulating in the upper part where it dissipates by conduction, radiation and convection through ventilation holes.

There are two basic recessed can designs of the invention, one of which utilizes a combined lamp mount socket and ballast compartment in an integral unit which threads into the existing incandescent lamp base socket of an existing can. The other variety has a ballast compartment which is separated from the rest of the fixture and is mounted in an annular ring flush against the bottom surface of the ceiling around the lamp opening. This rim-mounted circuit connects to the fluorescent base mounting socket, diverting incoming power from the power company and delivering it to the lamp in useable form. Both versions embody the essential features of the invention wherein the ballast is separate from, and in fact does not even share a compartment with, the lamp, and a corridor for an air curtain is established between ballast and lamp.

Other forms of the invention are surface-mount fixtures specifically designed for use with electronic ballast lamps, whereby the power converting circuit is preferably physically isolated from hot air currents produced within the lamp housing and cool airflow is established between lamp and ballast. The surface mounted models are substantially functionally identical to the recessed fixtures insofar as the features that are germane to the invention are concerned. They have isolated ballasts, and in most instances the ballast is in an annular housing that acts as a rim bordering the light opening. Open-ended corridors are assured between ballast and lamp, and where practical the ballast is disposed below, or at least lower than, the lamp.

BRIEF DESCRIPTION OF THE DRAWINGS

FIG. 5 is an exploded perspective illustrating the mounting of a high intensity discharge (HID) lamp in the unitary fixture illustrated in FIG. 4;

FIG. 6 is an isometric view of a unitary housing similar to that of FIGS. 4 and 5 but designed for mounting a low-voltage halogen lamp shown as exploded from the housing, in a model which is ready for wiring directly to house current rather than screwed into an existing socket;

FIG. 6a is an isometric view of a unitary housing similar to that of FIG. 6 but having a swivel lamp mount to permit reorientation of the lamp to designate a different area as the illumination target;

FIG. 10 is an exploded isometric view of a modified non-circular surface mount fixture in which the ballast is isolated above the lamp housing in a rectangular container which defines an air space with the lamp housing;

FIG. 11 is a transverse section taken through the fixture of FIG. 10; and, FIG. 12 is a diagram illustrating empirically derived temperatures found at various levels in a ceiling can housing a 27-watt fluorescent tube in a 25° centigrade room.

DETAILED DESCRIPTION OF THE PREFERRED EMBODIMENT

The fixture of the invention comes in two basic styles: the ceiling can retrofit, and the non-retrofitted surface mount model. The can retrofit design is provided as either an integral unit or a separate ballast compartment and lamp mounting socket. The surface mount unit is shown in several exemplary configurations, with both straight and 2-D-style tubes. All of the examples remove the ballast from the lamp housing and create a preferably circulating air space between ballast and lamp housing. In a primary implementation of the inventive concept the ballast is configured as an annular rim around the lamp face, in which the ballast housing serves as a reflective and decorative element as well as being safely positioned beneath and removed from the hot lamp. This ring need not be round, as there are square cans as well as round ones and a few other polygonal shapes. Because the ballast is preserved as a result of the invention, all lamps used in the disclosed fixtures would be of the type which do not integrate the ballast as disposable structure with the tube.

Figure 1:
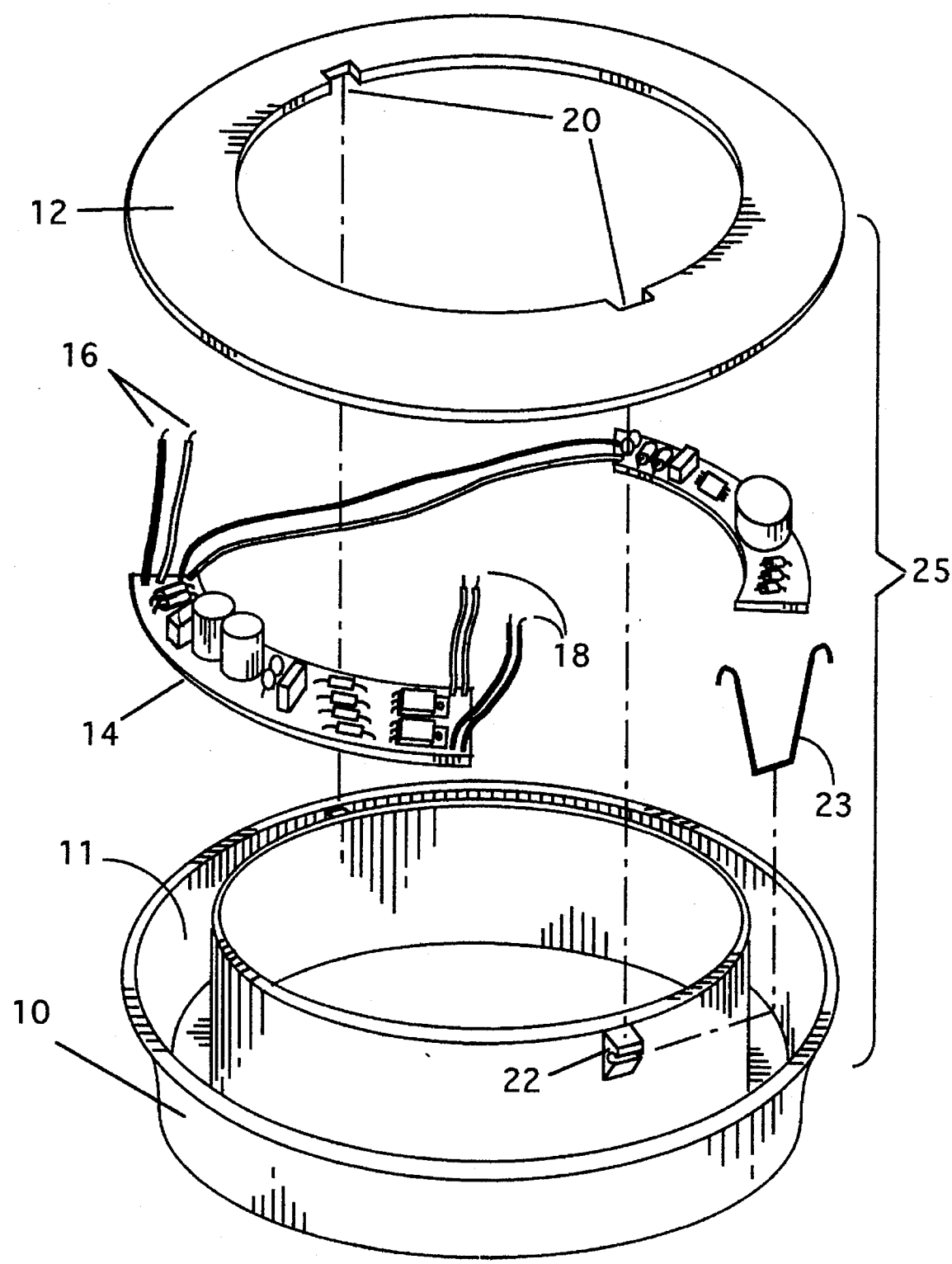
FIG. 1 illustrates a compartment containing the ballast or other power stabilizing circuitry, with the annular cover exploded.
Figures 2, 3, 3A:
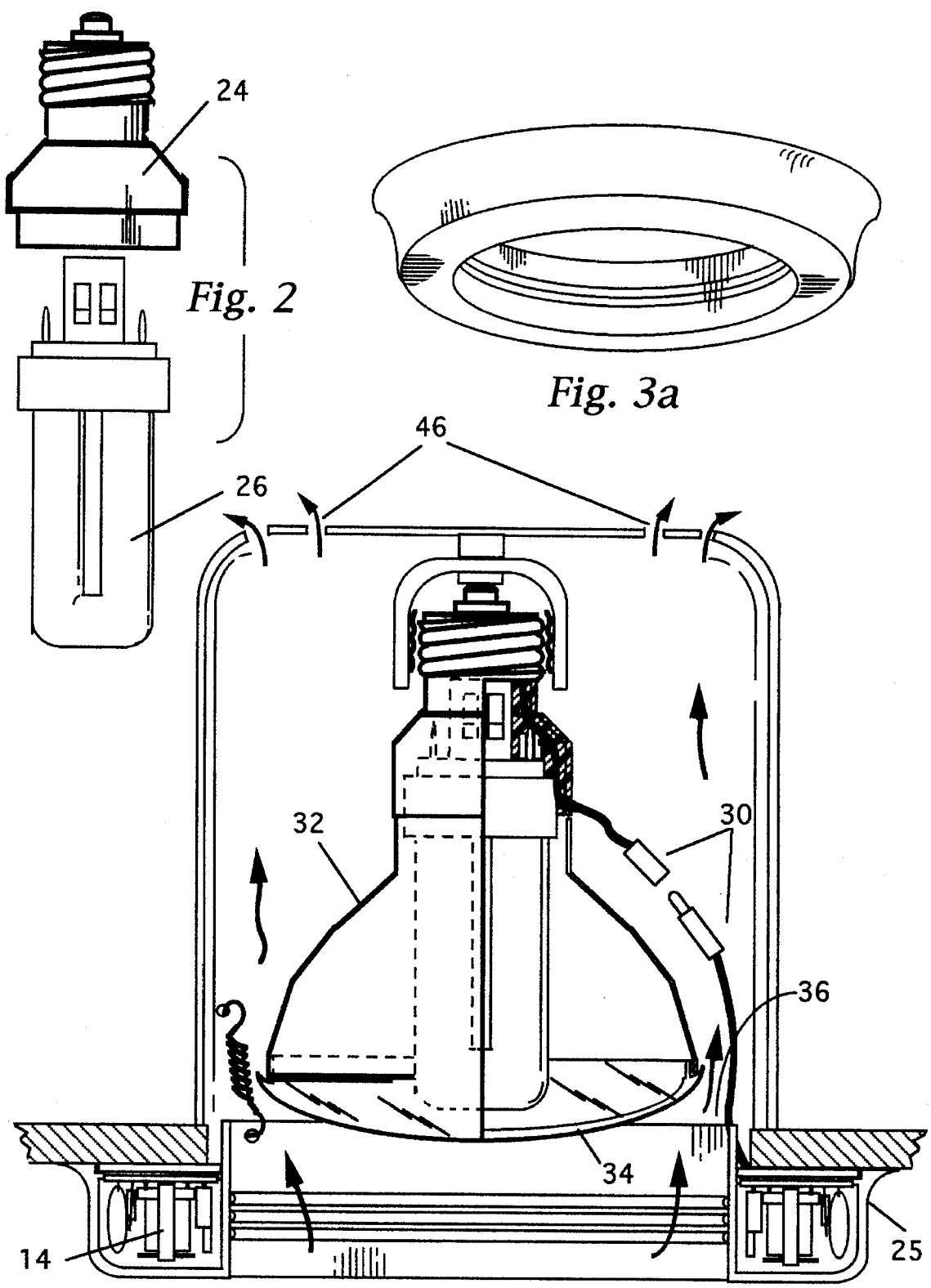
FIG. 2 illustrates an adapter socket exploded from a fluorescent tube designed for use replacing incandescent bulbs.
FIG. 3 is a side elevation view, partly in section, of a complete ceiling can mount as it would appear substantially in-place using a ballast compartment which is separate from the socket mount and connected thereto with wiring.
FIG. 3a is an isometric view of the ballast housing ring if the fixture illustrated in FIG. 3, shown in isolation from the remaining structure of the fixture.

The ballast-mounting compartment is shown in isolation in FIG. 1 for a typical can mount of the two-piece configuration in which the ballast and lamp socket are separate. It illustrates the ballast rim housing which is generic to not only this model but the surface-mount configurations of FIGS. 7 through 9 as well. The compartment 10 is formed by an annular trough 11, which together with the annular cover plate 12, encloses the ballast or other signal processing device forming the circuitry 14 which connects to the incoming power supply with conductors 16 and outputs a processed power signal ready for use by the lamp through the wires 18. The cover plate 12 has notches 20 to accommodate the clips 22 which are used to engage the wire bales 23 in the typical ceiling mount can design. The unit of FIG. 1 can be coupled through an existing incandescent socket or connected directly to house current power wires. Power processing is accomplished completely by the ballast in the annular compartment, and the lamp socket as shown in FIG. 2 at 24 is a mechanical mount which physically accommodates the pin structure of the fluorescent lamp with an existing incandescent lamp socket. It also houses the internal wiring, not shown, which diverts power from the mounting socket in the can to the processing circuitry 14.

The annular ballast compartments or housings 10 and 25 of FIGS. 1 and 3, respectively, are representative of any of the compartments for any of the configurations having an annular ballast rim. This includes the unitary can mount of FIG. 4, the two-piece recessed can mount of FIG. 3, and the surface mount configurations of FIGS. 8 and 9. Minor details would be changed, for example there would be no need for the clips 22 for the surface mount, but otherwise the configuration remains substantially the same.

FIG. 2 illustrates a typical replacement fluorescent lamp 26 shown exploded from the fluorescent lamp mounting socket 24. This type of socket is too small to house the ballast as shown and is the second piece of the two-piece system of FIG. 3 in which the other piece is the ballast compartment rim 25 similar to the annular compartment 10 of FIG. 1 which is frontally mounted on the ceiling. FIG. 3 also illustrates a replacement tube having reflector 32, representative of a commercially available line of lamps. A cover 34 over the face of the lamp spans the interspace internally of the annular compartment 25. Note that the reflector 32 and the cover 34 together resemble a flood light, and the extended can length effected by the use of the ballast housing 25 enables the fluorescent replacement to used without extending beyond the can structure.

In the FIG. 3 embodiment, an air passageway 36 can be seen between the reflector 32 and the ballast compartment 25. This passageway is substantially continuous, and is vertical and wide enough that air freely flows up into the can, not shown, and out ventilating holes in the top of the can. Even though the flow is relatively slow, because the ballast rim is disposed below the lamp, it is not exposed to accumulated heat as it would be were it internal of the can, so that the effects of the thermally-aware positioning and the cool airflow are adequate to prevent overheating of the ballast, which would not be much hotter than ambient air temperature.

It can be appreciated from FIG. 3 that the ballast housing 25 does much more than just hide the ballast. The cylindrical inside wall of the housing defines a continuation of the flood reflector 32 and itself acts as a light-channelling reflector. It also has the effect of extending the overall length of the can so that the most exposed part of the lamp is still adequately recessed that it will not glare out the side, nor be visible to the eye from across the room. This advantage is applicable to all of the lamp variations that are substantially elongated, such as the flourescent of FIG. 2, although with the electronics being separated from the base of the lamp unit its overall length is reduced and is not the problem that it would be otherwise. Higher wattage lamps however come in longer sizes, and the cooling characteristics of the inventive improvements set forth herein make practical the use of longer lamps with higher wattage ratings.

As noted, although fluorescents and the other efficient lamps produce more light than incandescents per unit of consumed power, they still dissipate the major portion of their energy as heat. The less efficient incandescents get much hotter, but do not have circuitry that can be heat-damaged. The heat problem encountered when replacing incandescents with fluorescents in enclosures generally goes unmentioned to the purchaser making the upgrade decision. No doubt in many instances a building owner, looking forward to the money saved in electrical bills, is shocked to find that the replacement cost of the ballasts and fluorescent lamps more than erodes any savings he might have achieved from economy of energy consumption. And the non-commercial consumer, such as the homeowner or small apartment landlord, is lucky to have any technical support at all.

Figure 4:
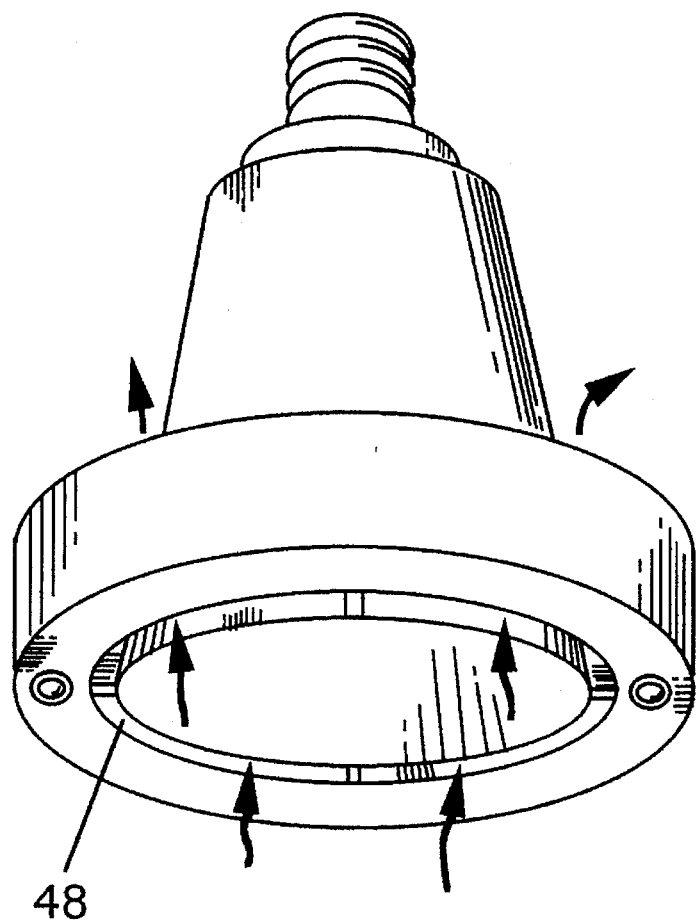
FIG. 4 is an isometric view of a unitary structure in which the ballast compartment and socket-mounting housing are produced and installed as a single unit, indicating the locations of built-in proximity or heat sensors.
Figure 4A:
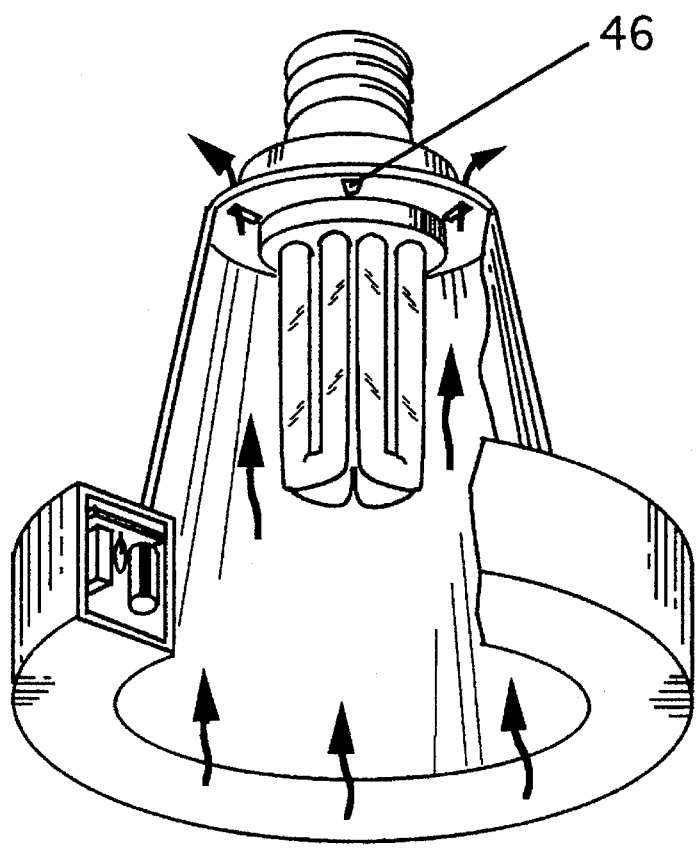
FIG. 4a is an isometric view, partially cut away, illustrating a unitary model similar to FIG. 4 but with a different air curtain and venting arrangement.

Separation of the ballast compartment and the mounting socket into two units provides additional flexibility in that the longitudinal spacing in the can and between the can socket and the ceiling surface, is not critical. However, the unitary fixtures shown in FIGS. 4–6 could be designed to be recessed slightly, with the ballast ring 28 inside the fixture as opposed to lying completely outside the fixture as does the ballast of the illustrated two-part unit of FIG. 3. FIGS. 4 and 4a represent two slightly different venting arrangements, both of which establish a circulating air curtain between the ballast housing and the lamp, and both housing the ballast in its own compartment, which does not include the lamp. FIG. 4a represents a unit that could be made as an integral unit, most likely in plastic, with the light cone integral with the ballast housing rim. The vent holes are located up near the lamp socket, to draw cool air between the lamp and ballast housing.

FIG. 5 is an integral unit substantially identical to the FIG. 4 configuration except that it mounts an HID lamp, shown exploded from its socket. It has a rim spaced from the main light cone as does the FIG. 4 lamp, and is intended to be used as a one-piece screw-in replacement lamp. FIG. 6 is the same kind of one-piece adaptation implementing the small halogen lamp and showing the direct-wired configuration rather than the screw-in mount. This lamp is so small it can be spaced forwardly by its mount as shown, and because the lamp itself has directional characteristics, as well as manuevering room due to its size, it can incorporate a swivel as shown at 35 in FIG. 6a. The swivel could be three-dimensional such as by using a ball-and-socket connection, although with the rotating adjustment which would be permitted if the fixture has a screw-in retrofit connection such as in FIG. 5, the hinge-action connection shown at 35 would be adequate.

Figure 7:
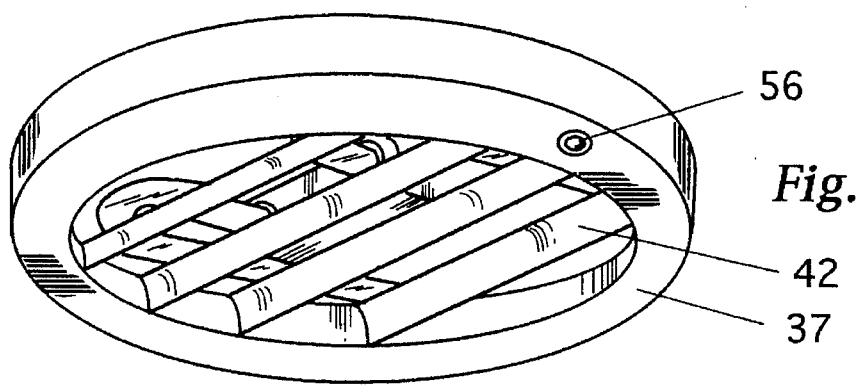
FIG. 7 is a perspective view of a surface mount housing for a 2-D style lamp, illustrating sensors built into the cowling of the ballast compartment.
Figure 8:
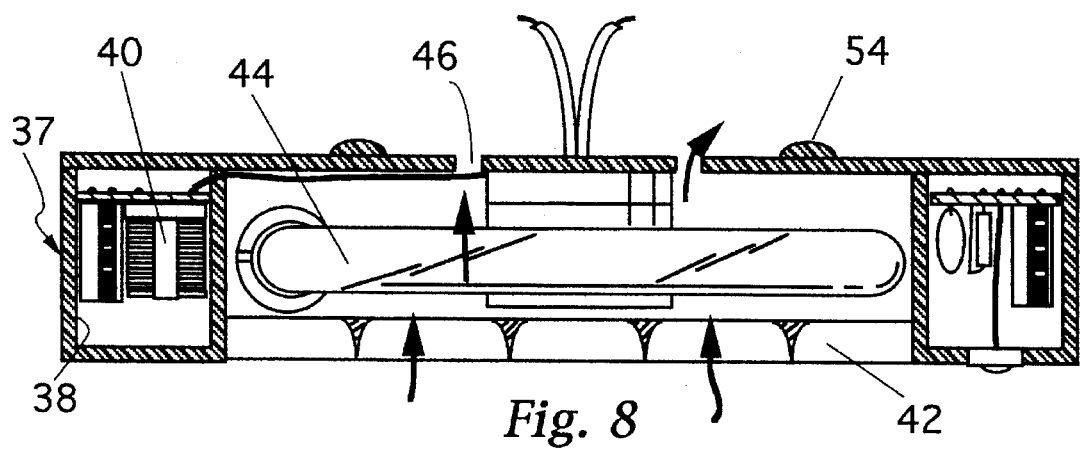
FIG. 8 is a vertical section taken through the surface mount fixture of FIG. 7.
Figure 9A:
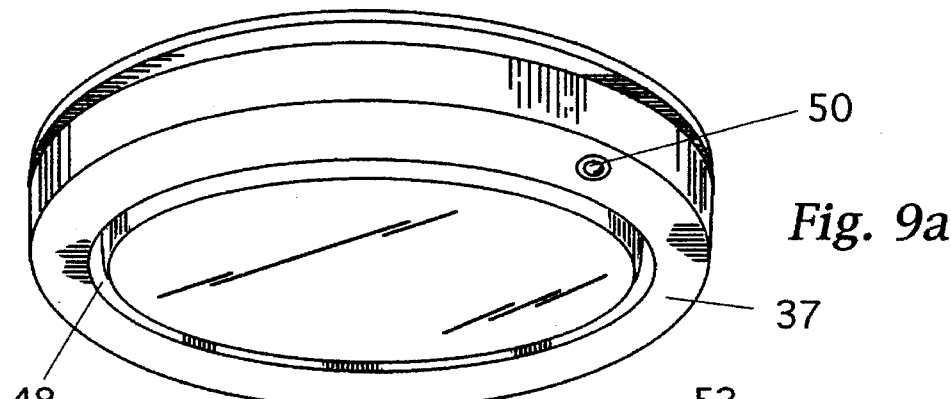
FIG. 9a is an isometric view of the unit illustrated in FIG. 9 as it would appear finished, on a ceiling.
Figure 9:
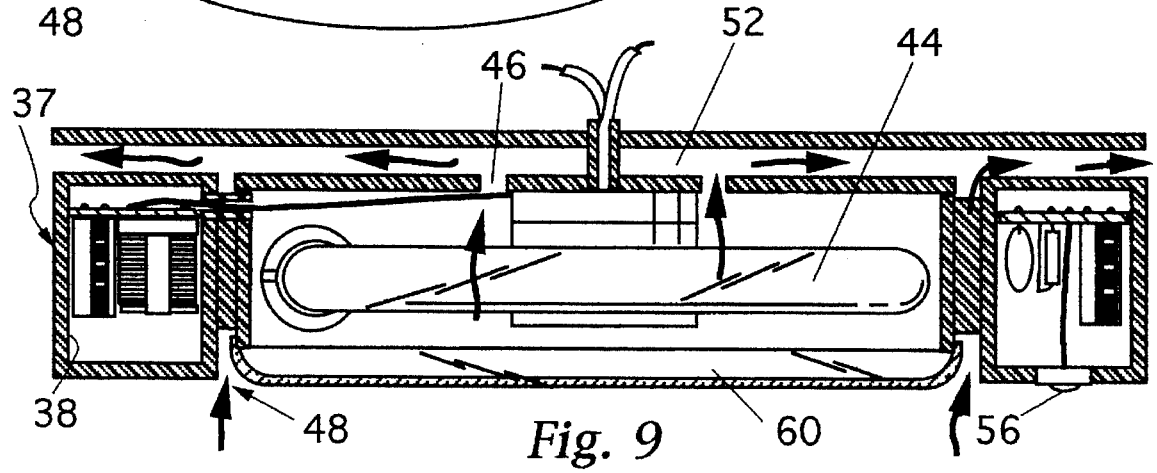
FIG. 9 is another section taken through a slight modification of the surface mount unit of FIGS. 7 and 8 in which a lens cover stops short of extending to the annular ballast compartment so that a passageway for an air curtain is defined.

Turning to the surface mount configuration illustrated in FIG. 7 through 9, the same concepts are carried forth in these embodiments with the annular housing 37 defining the ballast compartment indicated at 38 which houses the ballast 40, and in the unit of FIGS. 7 and 8 there being an open louvered cover 42 fitting inside the annular recess formed by the ballast compartment. The 2-D lamp 44 mounts in this cavity and a substantially continuous air vent ring 46 defined around the mounting socket forms the upper end of the continuous air passageway, which allows air to circulate up through the open louvers and around the lamp to be dissipated up through the ventilation slot. Spacers 54 on top of the housing ensure that the air passageway is complete.

FIG. 9 is a slightly different embodiment in which a different type of cover is used which defines the insulating passageway at 48 around the translucent cover 50 and through the specially provided air space 52.

Several of these embodiments also show optional sensors 56 mounted in the ballast compartment which conveniently houses the electronics for the sensor as well. The sensors could be any of the currently popular units such as heat-sensitive, motion-detecting, light-triggered, or a combination of these, and are not limited to the specific embodiments of the figures in which they have been shown. The configuration of the fixture is ideal for the incorporation of such options, since the electronics of the ballast are housed right at the point where the sensor should be, making it relatively easy to merge the electronics of the two systems in the space provided. Swivel adjustability is easily accomplished within the open spaces provided by the ballast housing.

To round out the examples, a rectangular planform unit is shown in FIGS. 10 & 11. This surface mount installation is more traditionally squared off. The dual lamps 26 are housed in the lamp housing 58, with the ballast compartment 60 being above the housing, covered with cover plate 62 which defines vents 64 and spaced from the sidewalls and bottom of the trough 66 to define the airspace 68. If this unit is wall-mounted, a continuously flowing air curtain will occupy the space 64. A ceiling mounting would produce eddy currents down through vent holes 64 and back up again. This embodiment has the same characteristics of removal of the ballast 14 (inside the compartment 60) from the lamp housing 58, and the provision of an air curtain between the housing and the ballast, as the others. There can be no air trapping as shown in FIG. 11 in this or the other examples. The cul-de-sac can of FIG. 11 is replaced by a continuous-flow insulation layer in all instances.

In the ongoing push to convert from incandescents to more efficient lighting systems, this invention, being the third in a series, moves forward yet another step the state of the art of incandescent lamp replacement, and the commensurate mitigation of the impact of humanity on world energy resources.

It is hereby claimed:

1. A lamp fixture for mounting at least one lamp which requires a power stabilizer circuit to operate and defines a base, and which illuminates a target area through an opening which passes a beam of light from said lamp therethrough, comprising:

(a) a lamp mount device defining a socket connectable to an available electrical power source for physically receiving and electrically powering the base of said lamp when inserted in said socket;

(b) a substantially continuous-loop-shaped ballast housing of planform dimension similar to the dimensions of said opening, for housing a power stabilizer circuit device;

(c) said power stabilizer circuit device for processing available power, said circuit device being substantially comprised of components housed in said ballast housing and operatively interconnected between said socket and power source to intercept and stabilize power from said power source and deliver power so stabilized and useable by said lamp to said socket; and, (d) means for supporting said ballast housing, in substantial thermal isolation from said lamp, as a rim around said opening such that said ballast housing is substantially distanced from lamp-generated accumulated heat; and, (e) said lamp fixture is of a recessed type which mounts said lamp spaced behind a room surface and said opening is defined in said surface and said ballast housing acts as a trim for said opening.

2. A light fixture according to claim 1 wherein said ballast housing defines a substantially cylindrical inwardly-directed inner surface generally paralleling said beam of light and said inner surface is reflective to act as a reflector for said beam of light.

3. A fixture according to claim 1 wherein said room surface comprises a ceiling and said lamp mount device is recessed into said ceiling and said ballast housing is substantially coplanar with said ceiling and defines a trim strip rimming said opening.

4. A fixture according to claim 3 wherein said ballast housing extends a substantial distance away from said ceiling and acts as an enclosed space extension to mask a substantial portion of a lamp mounted in said socket to reduce glare and bare lamp visibility.

5. A fixture according to claim 1 wherein said lamp mount device and ballast housing comprise a retrofit conversion for an existing installed recessed ceiling can and are separable units and said power stabilizer circuit device is interconnected with said socket by wires, and said means to support said ballast housing comprises wire clips to engage standard wire clip-engaging detents of said ceiling can.

6. A fixture according to claim 1 wherein said ballast housing includes at least one sensor integral therewith and interconnected with said power stabilizer circuit device at least to derive power therefrom and being exposed to the ambient environment.

\* \* \* \* \*